(12) United States Patent
Ozzello

(10) Patent No.: US 11,454,257 B2
(45) Date of Patent: Sep. 27, 2022

(54) SERVOVALVE FOR REGULATING THE FLOW OR PRESSURE OF A FLUID

(71) Applicant: FLUID ACTUATION & CONTROL TOULOUSE, Fonsorbes (FR)

(72) Inventor: Guylain Ozzello, Plaisance du Touch (FR)

(73) Assignee: FLUID ACTUATION & CONTROL TOULOUSE, Fonsorbes (FR)

( * ) Notice: Subject to any disclaimer, the term of this patent is extended or adjusted under 35 U.S.C. 154(b) by 78 days.

(21) Appl. No.: 17/044,323

(22) PCT Filed: Mar. 21, 2019

(86) PCT No.: PCT/FR2019/050644
§ 371 (c)(1),
(2) Date: Sep. 30, 2020

(87) PCT Pub. No.: WO2019/186031
PCT Pub. Date: Oct. 3, 2019

(65) Prior Publication Data
US 2021/0079934 A1 Mar. 18, 2021

(30) Foreign Application Priority Data
Mar. 30, 2018 (FR) ...................................... 1852793

(51) Int. Cl.
*F15B 13/04* (2006.01)
*F16K 31/08* (2006.01)
*F15B 13/044* (2006.01)

(52) U.S. Cl.
CPC ............ *F15B 13/044* (2013.01); *F16K 31/08* (2013.01); *F15B 13/0406* (2013.01)

(58) Field of Classification Search
CPC .......................... F15B 13/044; F15B 13/0406; F15B 13/0442; F15B 2013/0448; F16K 31/08; F16K 31/105
See application file for complete search history.

(56) References Cited

U.S. PATENT DOCUMENTS 3,866,620 A * 2/1975 Morton ............... F15B 13/0436
137/83
4,193,425 A 3/1980 Sopelem
(Continued)

*Primary Examiner* — Kelsey E Cary
(74) *Attorney, Agent, or Firm* — CRGO Global; Steven M. Greenberg

(57) ABSTRACT

The invention relates to a servovalve for regulating the flow or pressure of a fluid, comprising: a control stage comprising at least one permanent magnet, at least one coil and an armature (13) configured to be able to be driven in rotation around an axial direction; a power stage comprising a filler plate (23) and a drum (22) mounted rotatably in said filler plate (23); a slender mechanical transmission shaft (31) extending along said axial direction and having a first end (31a) connected to said armature (13) and an opposite end (31b) connected to said drum (22); characterized in that said control stage further comprises a slender torsionally flexible tube (32) extending along the axial direction (8) around said slender transmission shaft (31) and having a first end (32a) secured with said armature (13), shrunk onto said first end (31a) of said transmission shaft (31), and an opposite end (32b) clamped by a tube support (33) extending as far as said filler plate (23), so as to form a flexible mobile assembly that limits the frictional forces between said drum (22) and said filler plate (23) of the servovalve.

6 Claims, 2 Drawing Sheets

(56) References Cited

U.S. PATENT DOCUMENTS

Figure 1:
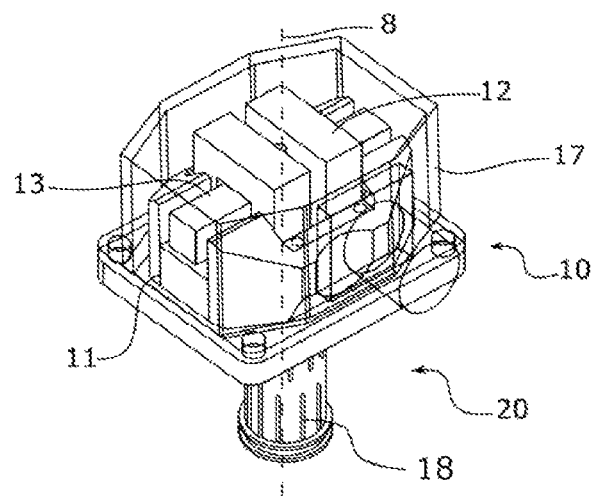

| | | | | |
|---|---|---|---|---|
| 4,442,855 | A | | 4/1984 | Hoffman et al. |
| 5,473,298 | A | * | 12/1995 | Teutsch ................... H01F 7/122 335/229 |
| 10,199,912 | B2 | * | 2/2019 | Tranovich ................ H02K 7/00 |
| 2013/0206260 | A1 | * | 8/2013 | Ozzello ............... F15B 13/0436 137/625.6 |
| 2017/0214305 | A1 | * | 7/2017 | Tranovich ............... H01F 7/145 |
| 2019/0123627 | A1 | * | 4/2019 | Bielen ................. F15B 13/0438 |

* cited by examiner

SERVOVALVE FOR REGULATING THE FLOW OR PRESSURE OF A FLUID

CROSS-REFERENCE TO RELATED APPLICATIONS

This application is a § 371 national phase entry of International Application No. PCT/FR2019/050644, filed Mar. 21, 2019, which claims priority to French Patent Application No. 1852793, filed Mar. 30, 2018.

1. TECHNICAL FIELD OF THE INVENTION

The field of the invention is that of regulating the flow or pressure of a liquid or gaseous fluid. The invention relates more particularly to a servovalve for regulating the flow or pressure of a fluid or allowing the servo control of a cylinder.

2. TECHNOLOGICAL BACKGROUND

A servovalve is an equipment item used within a servo loop in order to convert an electric current into an uncovered surface portion, this surface regulating more or less flow passage depending on the control current. Servovalves are used to perform the servo control of cylinder positions, to regulate an injection flow or to control the pressure of a system. There are a multitude of servovalve architectures, each having specificities and each being in line with its needs. The most widespread is the two-stage servovalve, which comprises a torque motor and a hydraulic power amplification stage ("jet pipe", plate nozzle or "clevis" type) that allows the power stage to be positioned in the position required by the system via a feedback rod.

Instead of the torque motor and the power amplification stage, it is possible, if the forces required for movement allow it, to use a valve with direct drive, also known as "direct drive valve," such as a proportional torque motor with limited displacement that positions a power stage which may be of the ball valve, cylindrical valve or "clevis" fork type in order to allow more or less flow to pass through the circuit in accordance with the command from its computer.

The function of the power stage is to deliver the required flows to the various hydraulic ports.

The control stage can in turn comprise a permanent magnet, a coil and an armature configured to be able to be driven in rotation about a direction, called the axial direction. If the coil is supplied with an electric current, said angular displacement of said armature is proportional to said supply current.

The power stage can for example comprise a filler plate and a drum mounted rotatably in said filler plate and each comprising fluid circulation channels arranged so as to be able to be placed in fluid communication based on the position of the drum with respect to the filler plate in order to deliver a variable flow as a function of the angular position of said drum with respect to the filler plate, the pressure difference between the cavities, and the geometry of the uncovered sections.

One of the parameters limiting the field of possible choices for the architecture of direct drive servovalves is meeting the hysteresis and resolution requirements necessary for efficient servo control. The connections must make it possible to minimize the friction between the filler plate and the drum, induced by the geometric defects of the parts. The connections must allow use with an extremely low mechanical clearance between the filler plate and the drum in order to minimize leaks and maximize the gain in pressure. Lastly, the connections must not allow any play in the transmission of movement between the armature to the drum so as not to take up the latter during changes of direction.

3. PURPOSES OF THE INVENTION

The invention aims to provide a servovalve that addresses at least some of the drawbacks of known direct drive servovalves.

The invention in particular aims to provide such a servovalve that has a minimized number of parts.

The invention also aims to provide, in at least one embodiment, a servovalve that has limited friction.

The invention in particular aims to provide, in at least one embodiment, a servovalve that has limited hysteresis.

The invention also aims to provide, in at least one embodiment, a servovalve that is not very sensitive to the manufacturing limits of the component parts of the servovalve.

The invention also aims to provide, in at least one embodiment, a servovalve whose control makes it possible to transmit a rotational movement with a limited angle, less than plus or minus 7°.

The invention also aims to provide, in at least one embodiment, a servovalve that does not require the presence of a dynamic seal.

The invention also aims to provide, in at least one embodiment of the invention, a servovalve that can be used with all types of fluids, liquid or gaseous.

The invention in particular aims to provide, in at least one embodiment, a servovalve that has limited hysteresis.

The invention also aims to provide, in at least one embodiment of the invention, a servovalve that makes it possible to significantly reduce the leakage between the circuits which can be connected by such a servovalve compared to single-stage jet pipe, clevis or plate nozzle servovalves.

The invention lastly aims to provide, in at least one embodiment of the invention, a servovalve forming a direct drive control member (direct drive valve type) making it possible to open or close large sections that cannot be targeted by single-stage jet pipe, clevis or plate nozzle type servovalves.

4. PRESENTATION OF THE INVENTION

To that end, the invention relates to a servovalve for regulating the flow or pressure of a fluid, comprising:
  a control stage comprising at least one permanent magnet, at least one coil and an armature configured to be able to be driven in rotation about a direction, called the axial direction, if at least one coil is supplied with an electric current, said angular displacement of said armature being proportional to said supply current,
  a power stage comprising a filler plate and a drum mounted rotatably in said filler plate and each comprising fluid circulation channels arranged so as to be able to be placed in fluid communication according to the position of the drum with respect to the filler plate to deliver a fluid to connection ports at a flow rate or pressure depending in particular on the rotation of said drum relative to the filler plate,
  a slender mechanical transmission shaft extending along said axial direction and having a first end connected to said armature and an opposite end connected to said drum so as to be able to mechanically transmit a control torque delivered by said armature to said drum.

A servovalve according to the invention is characterized in that said control stage further comprises a slender torsionally flexible tube extending along the axial direction around said slender transmission shaft and having a first end secured with said armature, shrunk onto said first end of said transmission shaft, and an opposite end clamped by a tube support extending as far as said filler plate, so as to form a flexible mobile assembly that limits the frictional forces between said drum and said filler plate of the servovalve.

A servovalve according to the invention therefore has the particularity of comprising a slender torsionally flexible tube that securely connects the movable armature of the control stage and the drum via the slender transmission shaft. This torsionally flexible tube extends along the axial direction and is torsionally deformable around this axial direction.

Thus and according to the invention, when the armature moves angularly under the effect of a supply current, the drum rotates from the same angular position to within the frictional forces and the inertia of the parts, the torsional stiffness of the transmission shaft being opposed for this purpose.

This connection between the armature and the drum by such a slender and pliable torsionally flexible tube and a slender transmission shaft makes it possible to limit the friction between the drum and the filler plate when the mobile assembly formed at least the tube support, the torsionally flexible tube, the armature, the slender transmission shaft and the drum is mounted on the filler plate.

In particular, the drum and the filler plate are never perfectly aligned because of the manufacturing limits of different parts of the servovalve. In addition, this system is hyperstatic, and it is therefore the flexibility of the parts that makes the system functional.

Now, the flexibility of the mobile assembly of the servovalve according to the invention, which is the result of the flexibility of the component parts of the servovalve according to the invention, allows the deformation of the parts and therefore makes it possible to limit the radial forces (that is to say the frictional forces) between the drum and the filler plate.

In particular, the torsion tube is slender in order to allow bending, which limits the contact forces between the drum and the filler plate.

The power stage of a servovalve according to the invention comprises a filler plate and a drum mounted rotatably in the filler plate and each comprising fluid circulation channels arranged so as to be able to be placed in fluid communication according to the position of the drum with respect to the filler plate to deliver a fluid to connection ports at a flow rate or pressure depending in particular on the rotation of said drum relative to the filler plate.

The fluid flow can depend not only on the position of the drum relative to the filler plate, but also on the uncovered section produced by the displacement of the drum with respect to the filler plate, the pressure difference across this section, the type of flow (laminar, turbulent, subsonic, etc.) and the considered fluid.

Advantageously and according to the invention, said end of said slender mechanical transmission shaft secured to said drum is further connected to said drum by means of a torque transmission plate secured to said drum, extending perpendicularly to said axial direction and having rigidity in said torque transmission axis and flexibility in the other directions.

In other words, preferably, the mobile assembly also comprises a torque transmission plate secured to said drum and connected to said transmission shaft.

Advantageously and according to the invention, said drum and said torque transmission plate are formed in one piece.

The combination of the slender torsionally flexible tube, the transmission shaft and the transmission plate makes it possible on the one hand to secure the armature of the control stage and the drum of the power stage and on the other hand to limit the frictional forces.

As a result, a servovalve according to the invention makes it possible to limit the hysteresis by limiting the friction between the drum and the filler plate.

The invention therefore makes it possible to limit the hysteresis by using a limited number of mechanical parts.

In addition, a servovalve according to the invention makes it possible to compensate for any errors in the manufacturing limit of the mechanical parts by limiting the frictional forces through the flexibility of the moving assembly.

A servovalve according to the invention is therefore less sensitive to variations in the manufacture of the parts than the servovalves of the prior art.

In particular, the mechanical limit range of the parts is attenuated by the flexibility of the functional parts (torsion tube, transmission shaft, drum, torque transmission plate) in the non-functional axes.

The higher the torque produced by the torque motor is, the greater the manufacturing limit of the parts can be. The greater the produced torque is, the less flexible the parts need to be.

One of the features of the invention is therefore to use flexible parts in non-functional directions, which make it possible to limit the radial forces, which is a source of friction and therefore a source of hysteresis.

Advantageously and according to the invention, said transmission shaft is also flexible in non-functional directions.

This advantageous variant makes it possible to further limit the radial forces and therefore the friction through the flexibility and suppleness of the transmission shaft.

Advantageously and according to the invention, said torsionally flexible tube has a length and a diameter whose ratio is greater than or equal to 8.

Preferably, the tube support is configured to maintain stiffness in the torsion axis of the torsionally flexible tube so that most of the flexibility in this direction lies with the torsionally flexible tube. Such a tube support is advantageously made of carbide.

The invention also relates to a servovalve characterized in combination by all or some of the features mentioned above or below.

5. LIST OF FIGURES

Figure 2:
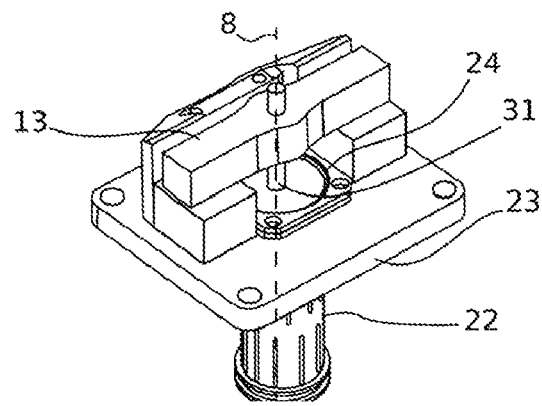
Figure 3:
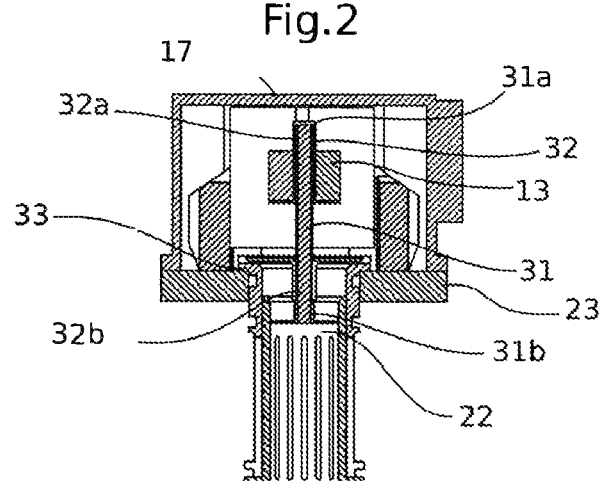
Figure 4:
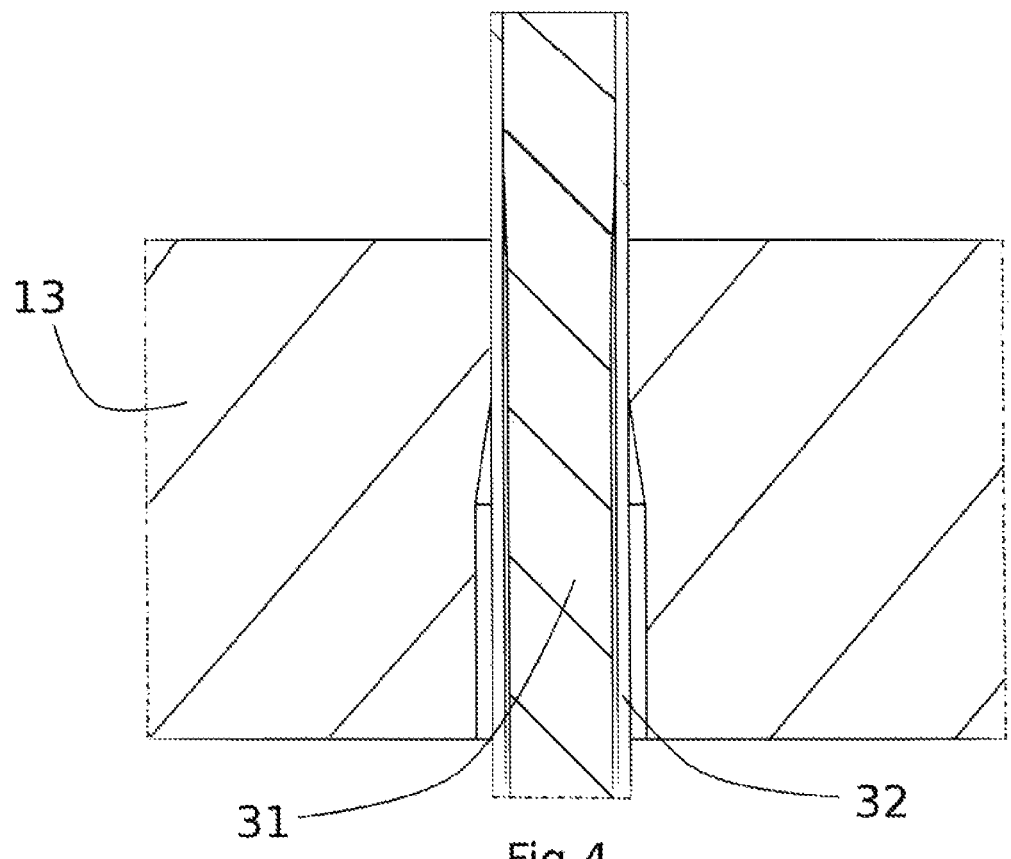
Figure 5:
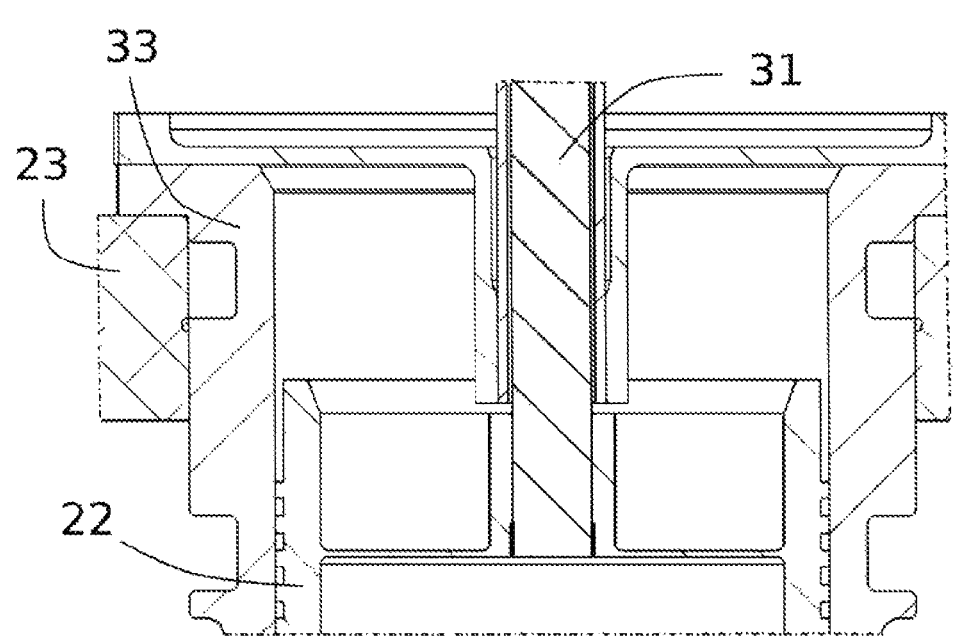

Further aims, features and advantages of the invention will become apparent upon reading the following description, which is provided solely by way of non-restrictive example, and which refers to the appended figures, in which:

FIG. 1 is a schematic perspective view of a servovalve according to another embodiment of the invention, FIG. 2 is a schematic view of the servovalve of FIG. 1 in which elements are not shown so as in particular to show the torque transmission plate, FIG. 3 is a schematic view in longitudinal section of the servovalve of FIG. 1, FIG. 4 is a schematic view in longitudinal section of an upper detail of FIG. 3 illustrating the connections between the armature, the torsionally flexible tube and the transmission shaft of the servovalve, FIG. 5 is a schematic view in longitudinal section of a lower detail of FIG. 3 illustrating the connections between the transmission shaft, the drum and the tube support of the servovalve

6. DETAILED DESCRIPTION OF AN EMBODIMENT OF THE INVENTION

For the sake of illustration and clarity, the scales and proportions are not strictly adhered to in the figures. Throughout the detailed description that follows in reference to the figures, unless otherwise indicated, each element of the servovalve is described as it is arranged when the servovalve is oriented such that said axial direction along which the torsionally flexible tube extends is vertical. This arrangement is shown in FIG. 1.

In addition, identical, similar or analogous elements are denoted using the same reference signs throughout the figures. The longitudinal direction corresponds to the axial direction that is the main direction of the torsionally flexible tube.

The servovalve shown in the figures comprises a control stage 10 and a power stage 20.

The control stage 10 is housed in a casing 17, shown transparently in FIG. 1 to reveal the parts of the servovalve housed in the casing 17. This control stage 10 comprises two permanent magnets 11, two coils 12 and an armature 13 configured to be able to be driven in rotation around an axial direction 8, if the coils 12 are supplied with an electric current.

The angular displacement of the armature 13 is proportional to the supply current of the coils 12. In the figures, the supply circuit of the coils is not shown for the sake of clarity.

The permanent magnets 11 can for example be magnets made of an alloy of samarium and cobalt. Of course, other magnets can be used without calling the principle of the invention into question.

The power stage 20 comprises a filler plate 23 and a drum 22 mounted rotatably in the filler plate 23 and each comprising fluid circulation channels, arranged so as to be able to be placed in fluid communication according to the position of the drum with respect to the filler plate to deliver a fluid to connection ports at a flow rate or pressure proportional to the rotation of the drum 22 relative to the filler plate 23.

The servovalve also comprises a slender mechanical transmission shaft 31 extending along the axial direction 8. This shaft has a first end 31a connected to the armature and an opposite end 31b connected to the drum 22 so as to be able to mechanically transmit a control torque delivered by the armature 13 to the drum 22. This transmission shaft is for example made of tungsten carbide in order to limit the differential angular displacement between the armature and the drum. The torsionally flexible stiffness of such a shaft will be at least 30% stiffer in torsion than that of the torsionally flexible tube 32 described below.

The end 31b of the transmission shaft 31 is connected to the drum 22 by means of a torque transmission plate 24.

This torque transmission plate 24 has a rigidity in the axial direction and a flexibility in the other directions.

According to the embodiment of the figures, the torque transmission plate 24 has a thickness of 0.3 mm, a torsionally flexible rigidity of 200 Nm/rad in the functional (torque transmission) direction and a flexibility in the directions perpendicular to the torsion tube axis of 1000 N/rad.

The servovalve also comprises a slender torsionally flexible tube 32 that extends along the axial direction 8 around the transmission shaft 31. This torsionally flexible tube 32 has a first end 32a secured with the armature 13 that is shrunk onto the first end 31a of the transmission shaft 31. The torsionally flexible tube 32 also comprises an opposite end 32b clamped by a tube support 33 that extends to the filler plate 23 and that allows the mobile assembly to be fitted on the filler plate.

FIG. 4 is a detailed schematic view of the shrinking of the torsionally flexible tube 32 on the transmission shaft 31. The connection between the armature 13 and the torsionally flexible tube 32 is also obtained by shrinking the tube on the armature 13. This shrinking is obtained by a tight fit of the torsionally flexible tube 32 in a bore formed in the armature 13. The transmission torque is obtained in a conventional manner by the conjunction of the effects due to friction and clamping in the contact zone between the two parts. In other words, this view provides a detailed illustration of the upper portion of FIG. 3.

FIG. 5 is a detailed schematic view of the connection between the transmission shaft 31, the drum 22 and the tube support 33 at the lower end of the transmission shaft 31. In other words, this view provides a detailed illustration of the lower portion of FIG. 3.

According to one embodiment of the figures, the torsionally flexible tube 32 has a ratio between the length and the outer diameter of the tube of 8. The tube is for example made of a material of the copper beryllium type.

The flexibility of the torsionally flexible tube is for example 900N/rad in the axes transverse to the axis of the torsion tube. Its stiffness in the axis of torsion is for example 14 Nm/rad.

In general, the component parts of the servovalve are chosen so that the ratio between the torque produced by the torque motor and the friction torque is greater than 50.

Thus, a servovalve according to the invention makes it possible to form a mobile assembly that limits the frictional forces between the drum and the filler plate of the servovalve.

Of course, the materials and numerical values given by way of example are not limiting and a servovalve according to the invention can have other embodiments which make it possible to address the technical problem underlying the invention, which is to reduce friction and present a limited hysteresis meeting the need for a servo loop despite a limited number of parts.

The invention claimed is:

1. A servovalve for regulating the flow or pressure of a fluid, comprising:
   a control stage comprising at least one permanent magnet, at least one coil and an armature configured to be able to be driven in rotation about a direction, called the axial direction, if at least one coil is supplied with an electric current, said rotation of said armature being proportional to said supplied electric current,
   a power stage comprising a filler plate and a drum mounted rotatably in said filler plate and said drum comprising fluid circulation channels arranged so as to be able to be placed in fluid communication according to the position of the drum with respect to the filler plate to deliver a fluid to at a flow rate or pressure depending on the rotation of said drum relative to the filler plate, a mechanical transmission shaft extending along said axial direction and having a first end connected to said armature and an opposite end connected to said drum so as to be able to mechanically transmit a control torque delivered by said armature to said drum along a torque transmission axis, wherein said control stage further comprises a torsionally flexible tube extending along the axial direction around said transmission shaft and having a first end secured with said armature, shrunk onto said first end of said transmission shaft, and an opposite end clamped by a tube support extending as far as said filler plate, so as to form a flexible mobile assembly that limits the frictional forces between said drum and said filler plate of the servovalve.

2. The servovalve according to claim 1, wherein said end of said mechanical transmission shaft secured to said drum is connected to said drum by means of a torque transmission plate secured to said drum, extending perpendicularly to said axial direction and having rigidity in said torque transmission axis and flexibility in the other directions.

3. The regulating servovalve according to claim 2, wherein that said drum and said torque transmission plate are formed in one piece.

4. The regulating servovalve according to claim 2 wherein said torque transmission plate is rigid in the axial direction and flexible in all other directions.

5. The regulating servovalve according to claim 1 wherein that said tube support is made of carbide.

6. The regulating servovalve according to claim 1 wherein said torsionally flexible tube has a length and a diameter whose ratio is greater than or equal to 8.

* * * * *